(12) United States Patent
Wee et al.

(10) Patent No.: US 9,408,273 B2
(45) Date of Patent: Aug. 2, 2016

(54) SYSTEM AND DEVICE FOR DRIVING A PLURALITY OF HIGH POWERED LED UNITS

(71) Applicant: OPULENT ELECTRONICS INTERNATIONAL PTE LTD, Singapore (SG)

(72) Inventors: Kai Fook Francis Wee, Singapore (SG); Chye Boon Tan, Penang (MY); Hai Boon Tan, Penang (MY); Andrea Stona, Bolzano (IT); Soon Thiam Chan, Penang (MY)

(73) Assignee: OPULENT ELECTRONICS INTERNATIONAL PTE LTD., Singapore (SG)

( * ) Notice: Subject to any disclaimer, the term of this patent is extended or adjusted under 35 U.S.C. 154(b) by 38 days.

(21) Appl. No.: 14/009,449

(22) PCT Filed: Nov. 2, 2012

(86) PCT No.: PCT/SG2012/000415
§ 371 (c)(1),
(2) Date: Oct. 2, 2013

(87) PCT Pub. No.: WO2013/066270
PCT Pub. Date: May 10, 2013

(65) Prior Publication Data
US 2015/0312989 A1 Oct. 29, 2015

(30) Foreign Application Priority Data

Nov. 4, 2011 (SG) .............................. 201108173-4
Apr. 13, 2012 (SG) .............................. 201202701-7

(51) Int. Cl.
*G05F 1/00* (2006.01)
*H05B 33/08* (2006.01)
(Continued)

(52) U.S. Cl.
CPC ............. *H05B 33/0854* (2013.01); *H02H 7/20* (2013.01); *H02H 9/041* (2013.01); *H02H 11/002* (2013.01); *H05B 33/089* (2013.01); *H05B 33/0845* (2013.01); *H05B 37/0218* (2013.01); *H05B 37/0227* (2013.01)

(58) Field of Classification Search
CPC ........... H05B 33/0833; H05B 33/0806; H05B 33/0845; H05B 33/089
See application file for complete search history.

(56) References Cited

U.S. PATENT DOCUMENTS 6,369,525 B1    4/2002   Chang et al.
6,784,622 B2 *   8/2004   Newman, Jr. ........ H05B 41/282
                                                                   315/219

(Continued)

FOREIGN PATENT DOCUMENTS

WO    2010148196 A2    12/2010

OTHER PUBLICATIONS

International Search Report and Written Opinion issued in corresponding PCT Application No. PCT/SG2012/000415, dated Dec. 18, 2012.

(Continued)

*Primary Examiner* — Jason M Crawford
(74) *Attorney, Agent, or Firm* — MKG, LLC

(57) ABSTRACT

A system for driving a plurality of high powered LED units, the system comprising a single driver for providing ripple free constant direct current to a plurality of high powered LED lamp units, wherein the single driver comprises a digital controller programmable to adjust the ripple free constant direct current at every predetermined time interval based on detection and computation of the duration taken for the energy to be discharged to the LED lamp unit to adjust the ripple free constant direct current. The above system achieves a one driver to many LED lamp units such that it alleviates or eliminates the need to have a driver attached to each LED lamp unit.

19 Claims, 12 Drawing Sheets

(51) Int. Cl.
*H05B 37/02* (2006.01)
*H02H 7/20* (2006.01)
*H02H 9/04* (2006.01)
*H02H 11/00* (2006.01)

(56) References Cited

U.S. PATENT DOCUMENTS

| | | | | |
|---|---|---|---|---|
| 6,791,279 | B1* | 9/2004 | Shearer | H05B 41/2822 315/209 R |
| 7,804,256 | B2* | 9/2010 | Melanson | H05B 33/0815 315/224 |
| 7,852,300 | B2 | 12/2010 | Shteynberg et al. | |
| 7,863,828 | B2* | 1/2011 | Melanson | H02M 1/4225 315/247 |
| 7,902,771 | B2 | 3/2011 | Shteynberg et al. | |
| 8,076,920 | B1 | 12/2011 | Melanson | |
| 2009/0278463 | A1 | 11/2009 | Tang | |
| 2010/0026208 | A1* | 2/2010 | Shteynberg | H05B 33/0815 315/297 |
| 2010/0079124 | A1 | 4/2010 | Melanson | |
| 2011/0031899 | A1* | 2/2011 | Chu | H05B 33/0815 315/307 |
| 2011/0057577 | A1* | 3/2011 | Otake | H05B 33/0803 315/291 |
| 2011/0068713 | A1 | 3/2011 | Hoogzaad et al. | |
| 2011/0074302 | A1 | 3/2011 | Draper et al. | |
| 2011/0080112 | A1* | 4/2011 | Shearer | H05B 33/0815 315/291 |
| 2011/0309759 | A1* | 12/2011 | Shteynberg | H05B 33/0815 315/201 |
| 2011/0309760 | A1* | 12/2011 | Beland | H02M 1/4258 315/201 |
| 2012/0139435 | A1* | 6/2012 | Storm | H02M 1/4225 315/224 |
| 2012/0217873 | A1* | 8/2012 | Tanaka | H05B 33/0815 315/82 |
| 2012/0242242 | A1 | 9/2012 | Linz et al. | |
| 2012/0268039 | A1* | 10/2012 | Chen | H02M 3/33523 315/308 |

OTHER PUBLICATIONS

Ye, Z. et al. "Single-Stage Offline SEPIC Converter with Power Factor Correction to Drive High Brightness LEDS", IEEE 2009, pp. 546-553.

Wang, S. et al. "A flicker-free electrolytic capacitor-less ac-dc LED driver", IEEE 2011, pp. 1-2.

Supplemental European Search Report issued in corresponding EP Application No. 12845940, dated Mar. 14, 2016, pp. 1-8.

* cited by examiner

| | Electronic Ballast + In Build Driver MR16 (1:1 option) | String Driver + Driverless MR16 (1:Multiple Option) |
|---|---|---|
| Constant Current Driven | Different among each MR16 because design tolerance of each in build driver + Electronic Ballast behavior | All MR16 will having identical current due to driven by single driver and in series connection |
| Light Output Uniformity | Different among each other due to each in build driver having different driving current | Very uniform among each other because of single driver and with constant current driven |
| Power Factor | Low because in build output load not meeting Electronic Ballast minimum load requirement | High because string driver been designed for the Driverless purpose |
| Efficiency | Low since Electronics Ballast not compatible with in-build LED MR16 and causing output current drop when connected | High due to the string driver been designed to tailor the output load range requirement |
| Dimming | Flickering as the in build driver design not fulfilling Triac Dimming Minimum holding current requirement | Dim perfectly with Potential Meter, Motion/Ambient Sensor and Infra-Red Sensor |
| Wire Connection length | Drop in output driving current when the connection length exceed the allowable specification (in general < 2meter) | Output driving current not affected by wire connection length |

Fig. 6

Constant current @504mA
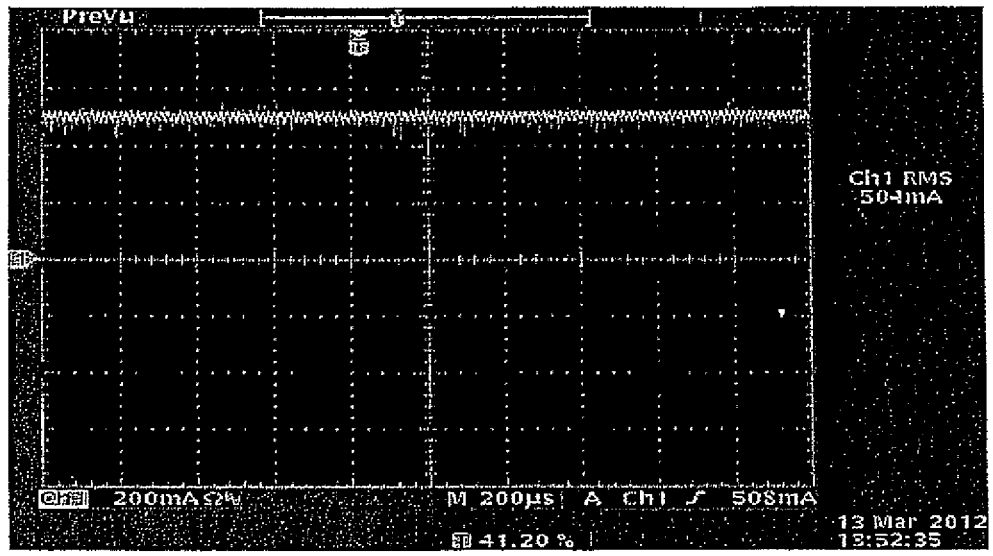
Ripple of 20mA (3.9% of 504mA)
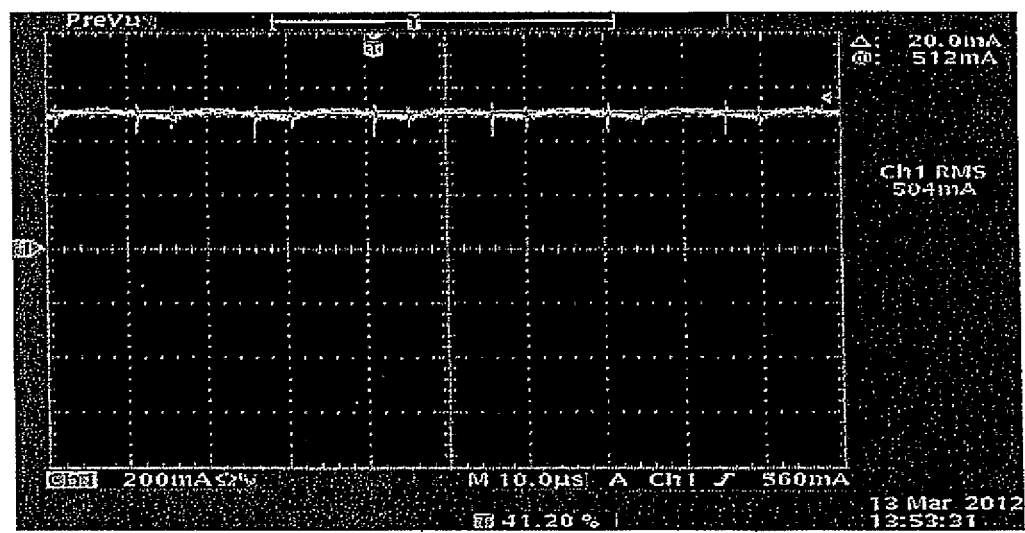
Fig. 7

SYSTEM AND DEVICE FOR DRIVING A PLURALITY OF HIGH POWERED LED UNITS

FIELD OF THE INVENTION

The present invention relates to a system and device for driving a plurality of high-powered light emitting diodes (LED) units. The device is particularly suitable, but not limited for use in high powered LED light units such as down lights, T5, T8, Light Troffer, Hi-Bay lamps and MR16 light bulbs etc.

BACKGROUND TO THE INVENTION

The following discussion of the background of the invention is intended to facilitate an understanding of the present invention. However, it should be appreciated that the discussion is not an acknowledgement or admission that any of the material referred to was published, known or part of the common general knowledge in any jurisdiction as at the priority date of the application.

Conventional lighting systems typically have a configuration where light products used in the systems are individually driven. For example, a light product such as a down light lamp has its own in-built power supply or ballast which converts incoming AC electrical supply to higher AC voltage and desired current that is required to provide electrical power to for example ignite and excite the gases (referring to CFL light) for lighting up of the down light. Examples of such other light products include T5, T8, Light Troffer, High-Bay lamps, street lamps and flood lamps.

Similarly, when Light Emitting Diodes (LEDs) were introduced in lighting systems, the configuration adopted for LEDs was based on a similar 'one-ballast (controller)' to 'one-lamp' arrangement of conventional lighting systems. Therefore, each LED light unit has its own in-built LED driver or controller that converts the incoming AC supply to DC voltage and current to light up the LED down light. This means that each LED light unit that is present in a lighting system has an accompanying controller dedicated to that particular LED light unit for converting the incoming AC supply to DC voltage and current for lighting up that particular LED light unit, i.e. a chain of ten LED down lights in a lighting system will require correspondingly ten LED controller circuits. These LED controllers increase the cost and overall form factor of each lamp unit.

A prior art LED light unit and system is illustrated in FIG. 1 and FIG. 2 respectively. The LED lamp unit comprises an AC source supply via AC Input Terminal 4, an AC-DC LED driver 3, a LED light/lamp module 1 and heat sink 2.

When connected, AC electrical supply current will flow to the input of the AC-DC LED driver 3. The AC supply current will be rectified via switch mode power supply circuitry in the AC-DC LED driver 3 to supply the desired DC voltage and current to the LED light module 1. For continuous light-up operation, as heat will be generated by both the AC-DC LED driver 3 and the LEDs on the LED light module 1, introduction of heat sink 2 is important to ensure the heat generated along the light-up operation is drawn from the heat source and dissipated accordingly. The heat sink 2 has to account for heat dissipation from both the LED light module and AC-DC LED driver. Consequently, if at any time along the light-up operation the heat sink 2 reaches its maximum heat dissipation capability due to the design limitation in size for standard form factor for the particular LED lighting unit fulfillment will lead to the degradation of light performance and product life span.

The above-mentioned configuration has several disadvantages including:

As each LED light unit requires its own in-built controller circuit 3 for lighting up, when the LED light unit is in continuous operation, considerable heat will be generated by both the LED and controller circuit. To moderate the heat, heat sink(s) must be present in each LED light unit for drawing the heat from the heat source and dissipating the heat to the surroundings so as to provide a thermally cool environment for the LED and controller circuit to operate in. It is important that the LED and controller circuit operate in a thermally cool environment because this will reduce power loss and hence improve efficiency. However, due to standard form factors, there is a limit as to the size of the heat sink in each LED light unit. As there are two heat generating sources in each LED light unit (i.e. the LED lamp unit and the LED controller), the heat sink 2 typically reaches its maximum heat dissipation capability during continuous operation where considerable heat is generated. Consequently, this will lead to the degradation of the LED light unit's light performance and product life span.

It is typically costly to manufacture LED light units which have built-in controller circuits and heat sinks 2 as they increase the number of components that are needed for manufacture. Furthermore, the heat sink must also be designed to cope with the dissipation of heat from two heat sources with the constraints on its size due to standard form factors. This further increases the overall cost of producing the LED light units.

As the AC supply will be converted to DC voltage and current in the LED light units by the controller circuits 3, there will be safety related issues that must be addressed. Hence, the LED light units will have to be designed such that they meet the standard safety requirements and size limitations imposed by standard form factors.

Therefore, it is an object of the present invention to overcome, or at least alleviate, at least the aforementioned problems.

SUMMARY OF THE INVENTION

The present invention provides a system and device to alleviate the above problems and to provide a 'one driver-too-many high powered LED lamp units' solution. To achieve the same, the system and device are suited to provide at least a relatively 'ripple free' current of less than 5% from the specified rated current. The specified rated current is typically (but not limited to) around 350 mA to 700 mA per lamp unit.

In addition, references to 'current', 'connection(s)' refer to electrical current and connections unless otherwise stated.

In accordance with a first aspect of the present invention there is a system for driving a plurality of high powered LED units, the system comprising a single driver for providing ripple free constant direct current to a plurality of high powered LED lamp units, wherein the single driver comprises a digital controller programmable to adjust the ripple free constant direct current at every predetermined time interval based on detection and computation of the duration taken for the energy to be discharged to the LED lamp unit to adjust the ripple free constant direct current.

Preferably, the single driver operates in an isolated alternating current fly back configuration having an inductive element as a transformer isolating the plurality of high powered LEDs at the secondary end of the transformer.

Preferably the digital controller is an Application Specific Integrated Circuit (ASIC); the ASIC further operable to detect and compute the duration of the energy discharged by the core of transformer to the plurality of high powered LEDs to regulate and provide the ripple free output DC current. The ASIC is preferably programmed to receive feedback at each clock-cycle based on the duration of the energy discharged by the core of the transformer as an input to determine the amount of ripple free constant DC current at the next clock-cycle. More preferably the ASIC is programmed to provide a voltage waveform to turn an electronic switch on and off at each clock-cycle.

Preferably each of the plurality of high powered LED lamp units is in series with the other high powered LED lamp units.

Preferably the single driver is electrically connected to a dimmer circuitry for adjusting the brightness of the plurality of high powered LED lamp units. The dimmer circuitry preferably comprises a potential meter, infra-red interface, motion sensor or ambient sensor.

Preferably the system comprises a filter capacitor operable to vary its capacitance to maintain a power factor of at least 0.9 when the dimmer is adjusted.

In the case where the dimmer is a potential meter, the potential meter is operable to work within a voltage of 0 to 10V.

Preferably in an isolated fly back mode the secondary end of the transformer is electrically connected to a short circuit protection circuit.

Preferably, the ASIC is coupled with an active power factor controller. More preferably the active power factor controller comprises at least one voltage follower. In such a case the ASIC is preferably a 14-pin configuration so as to control both the active power factor controller and the adjustment of the ripple-free constant DC current.

Preferably, each high powered LED lamp is provided with a heat sink shaped and configured to dissipate heat away from the high powered LED only.

Preferably, the system further comprises an electronic switch, wherein the ripple free constant DC current is achieved by means of voltage control according to the following equation:—

$$V_{OUT} = \frac{V_{IN} * T_{ON}}{T_{OFF}} \sqrt{\frac{L_2}{L_1}}$$

where $V_{OUT}$ is the voltage across the output; $V_{IN}$ is the input voltage; $T_{OFF}$ is the time of the discharge of the core of the isolating transformer; $T_{ON}$ is the switch on time of the electronic switch; $L_1$ is the inductance value of the primary windings of the transformer and $L_2$ is the inductance value of the secondary windings of the transformer.

As an alternative to the isolated configuration mode, the single driver may operate in a non-isolated configuration having an inductive element operating in a continuous mode in according to the following equation:

$$I_{OUT} = \left(T_{OFF} * I_1 + \frac{I_{MAX} * T_{OFF}}{2}\right) * \frac{1}{T}$$

where $T_{OFF}$ is fixed as a constant; $T_{ON}$ is the switch on time of the electronic switch; T is the summation of $T_{ON}$, $T_{OFF}$, and $T_{CALC}$ where $T_{CALC}$ is the time after the discharge time of the inductive element to compute the formula; $I_1$ is the desired reference current and $I_{MAX}$ is the peak current. In a hysteretic controller configuration, the value of $I_{MAX}$ and $I_1$ may be fixed, and the $T_{ON}$ and $T_{OFF}$ timings determined.

In accordance with a second aspect of the invention there is a LED driver comprising:

at least one Integrated Circuit (IC), the IC programmable using a hardware description language; a first electronic switch operable to provide a first switching time period to control power factor voltage, the first switching time period programmable by the at least one IC; and a second electronic switch operable to provide a second switching time period to regulate ripple free constant DC electrical current flowing into the at least one LED, the second switching time period is programmable by the at least one IC. Such an LED driver provides for an additional current control in the form of the power factor controller to achieve a ripple-free DC current.

Preferably, the first and second electronic switches are power MOSFETs.

Preferably, the at least one IC is an ASIC.

In accordance with a third aspect of the invention there is a LED driver comprising: a device having an input port and a plurality of output ports comprising a reverse polarity protector arranged to be electrically connected to the input port and each of the plurality of output ports; and a plurality of open circuit protection circuits, each of the plurality of open circuit protector operable to connect to an output port; wherein the reverse polarity protector is operable to negate the polarity requirement in the event where a load is connected with a wrong polarity to any of the output port; and the open circuit protection circuit is operable to form a closed loop series connection in the event where no load is connected to an output port or when a load breaks down.

Preferably the reverse polarity protector is a diode bridge rectifier.

Preferably each output port comprises a corresponding open circuit protector.

Preferably the input port is suitable for connection with a LED driver and each of the output port is suitable for connection with a load comprising a high powered LED lamp unit.

In accordance with a fourth aspect of the invention there is a system according to the first aspect wherein the load is in a series connection, further comprising the device according to the second third aspect of the invention claims 22 to 25; wherein the input port of the device of claims 22 to 25 is operable to be connected to the single driver.

In accordance with a fifth aspect of the invention there is a dimmer circuitry for use with a LED driver, the dimmer circuitry comprising at least a dimming interface operable to connect to at least one dimming controller; and a capacitive element adjustable to maintain a power factor of at least 0.9 within the dimmer circuitry.

BRIEF DESCRIPTION OF THE DRAWINGS

The following invention will be described with reference to the following drawings of which:

FIG. 6 is a table summarizing the advantages of the invention on a plurality of MR 16 LED lamp as compared to the prior art system;

FIG. 7 illustrates simulation results of the ripple free constant DC current based on a MR16 load;

Other arrangements of the invention are possible and, consequently, the accompanying drawings are not to be understood as superseding the generality of the preceding description of the invention.

DETAILED DESCRIPTION

In the context of the invention, the mention of 'ripple free' current and approximations to ripple free current refers to allowable ripple of less than (<) 5% from the specified rated current.

In the context of the invention, high powered LED lamp units refer to any LED lamp unit requiring a power of at least 5 watts.

Figure 1:
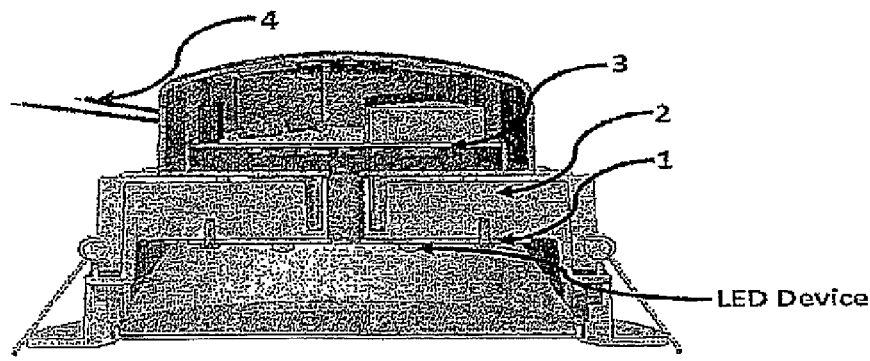
FIG. 1 is a perspective side view of a prior art LED lamp unit with driver and heat sink.
Figure 2:
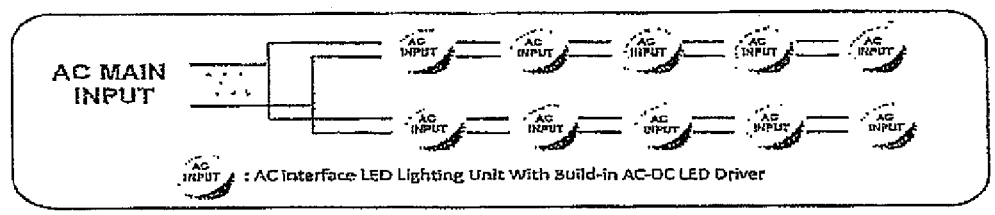
FIG. 2 is a system configuration of the 'one driver one lamp unit' configuration of the prior art LED lamp system.
Figure 3:
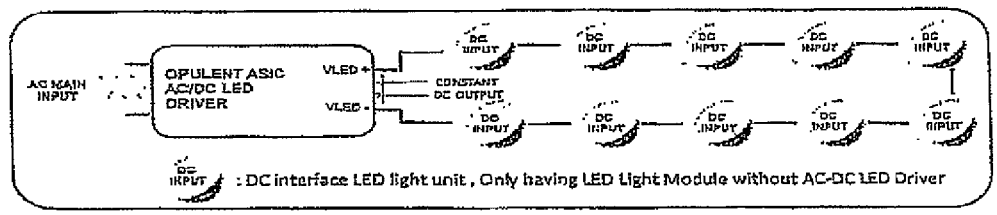
FIG. 3 is a system view of a 'one driver multiple lamp units' or 'string driver' in accordance to an embodiment of the invention.
Figure 4:
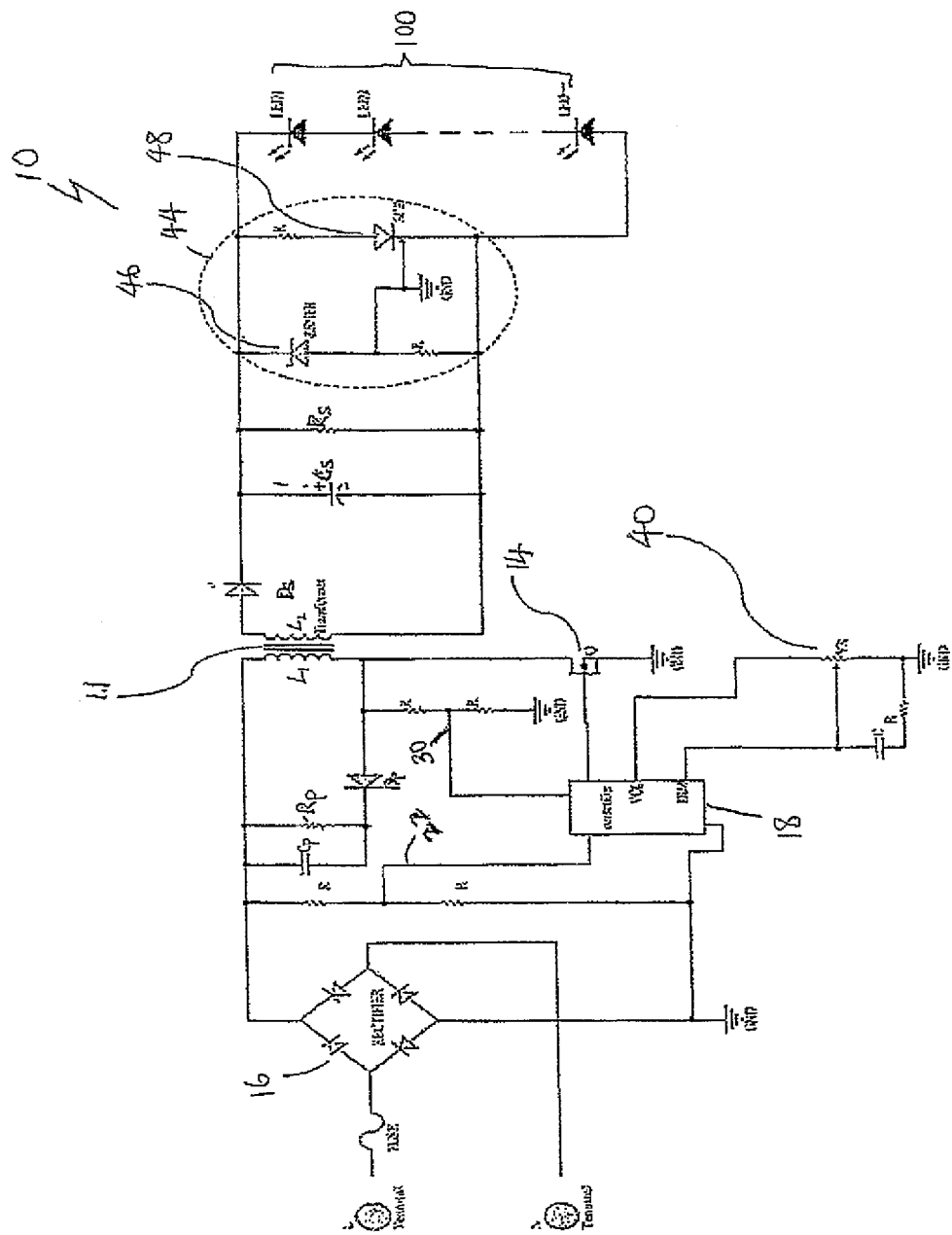
FIG. 4 is a circuit diagram of the LED driver circuit in accordance with an embodiment of the invention for isolated alternating current (AC) application.

In accordance with an embodiment of the invention there is a LED driver 10 for driving a plurality of high powered LED lamps 100 as illustrated in FIG. 4. LED driver 10 is particularly suited for an isolated alternating current (AC) application and comprises a primary side and a secondary side. The primary side of the LED driver 10 is decoupled with the secondary side via a decoupling transformer 11. The primary side comprises an electronic switch 14, bridge rectifier circuit 16, and an Integrated Circuit (IC) controller 18. Although FIG. 4 shows an isolated configuration, it is appreciated by a skilled person that the circuit may be modified for non-isolated configuration where the decoupling transformer 11 may be replaced by other inductive elements.

Figure 5A:
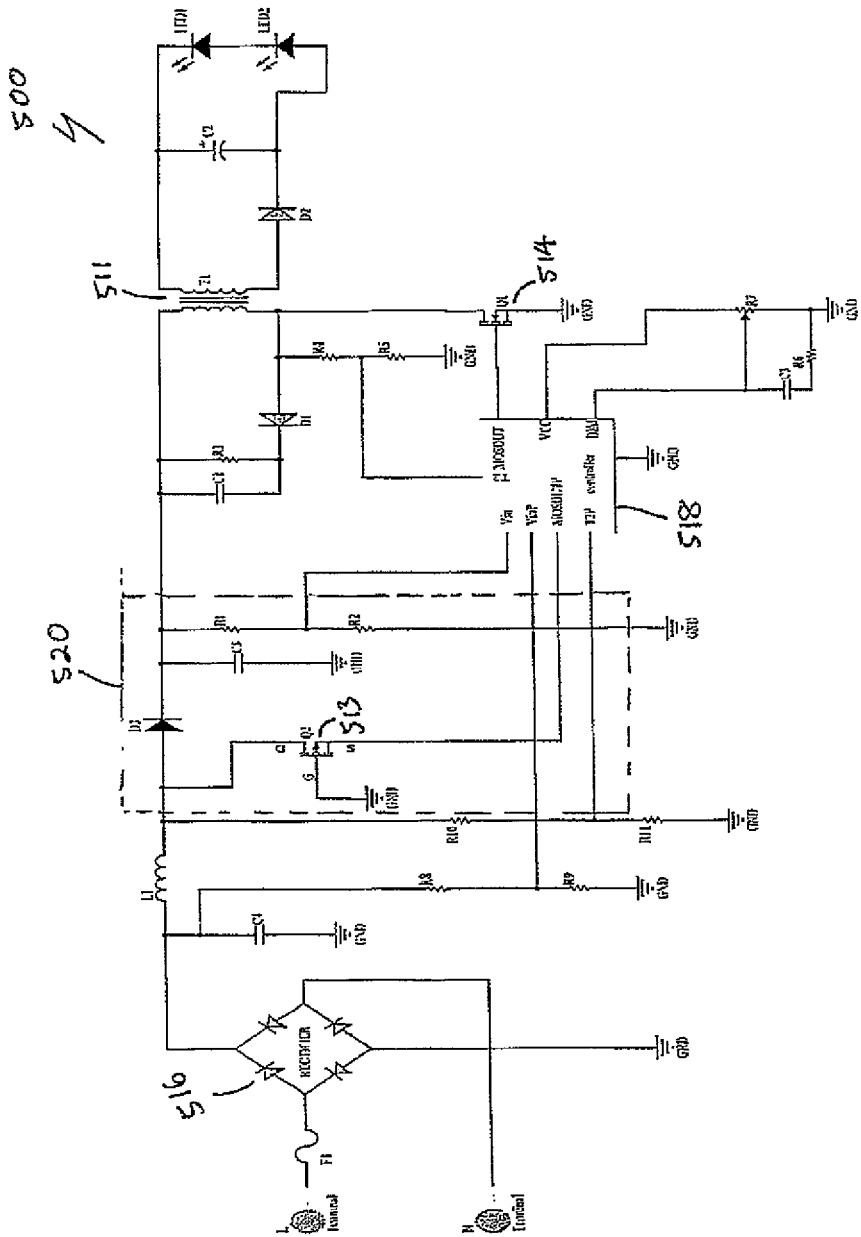
FIGS. 5a and 5b are circuit diagrams of the LED driver circuit with a power factor convertor driven by a 14-pin ASIC in accordance with another embodiment of the invention for isolating alternating current (AC) application.
Figure 5B:
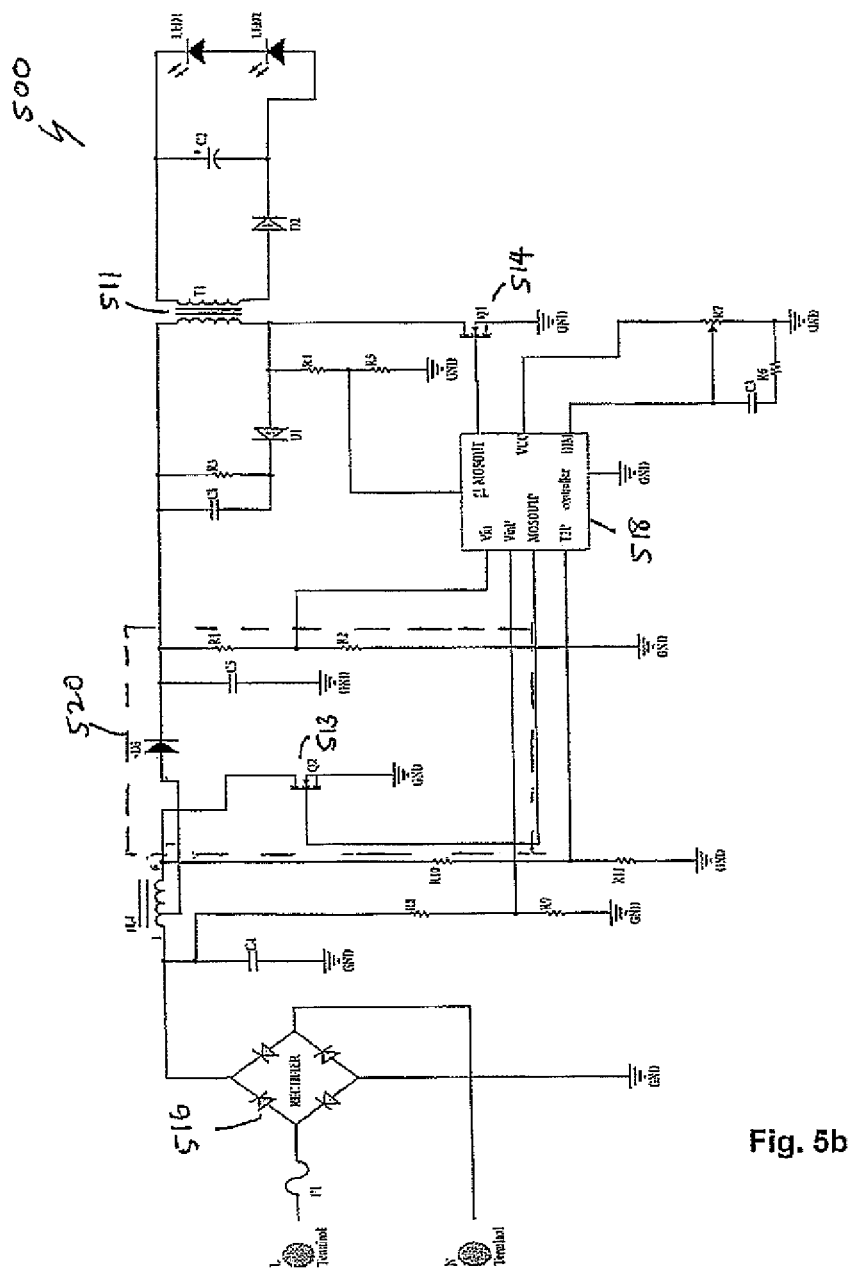
Figure 8:
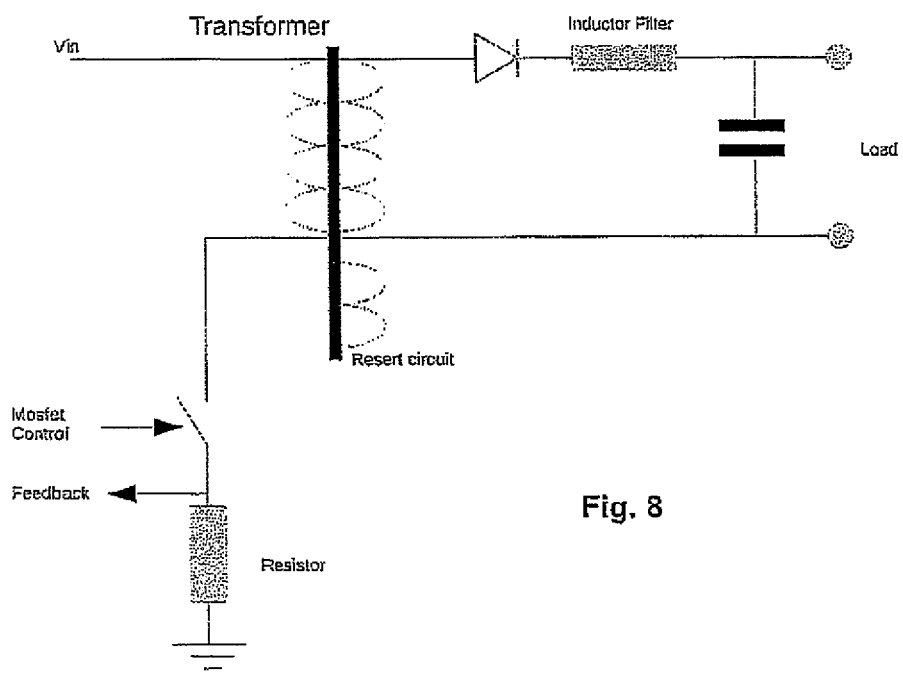
FIG. 8 illustrates another embodiment with an arrangement of circuit wherein the decoupling transformer operates in a continuous mode.
Figure 10:
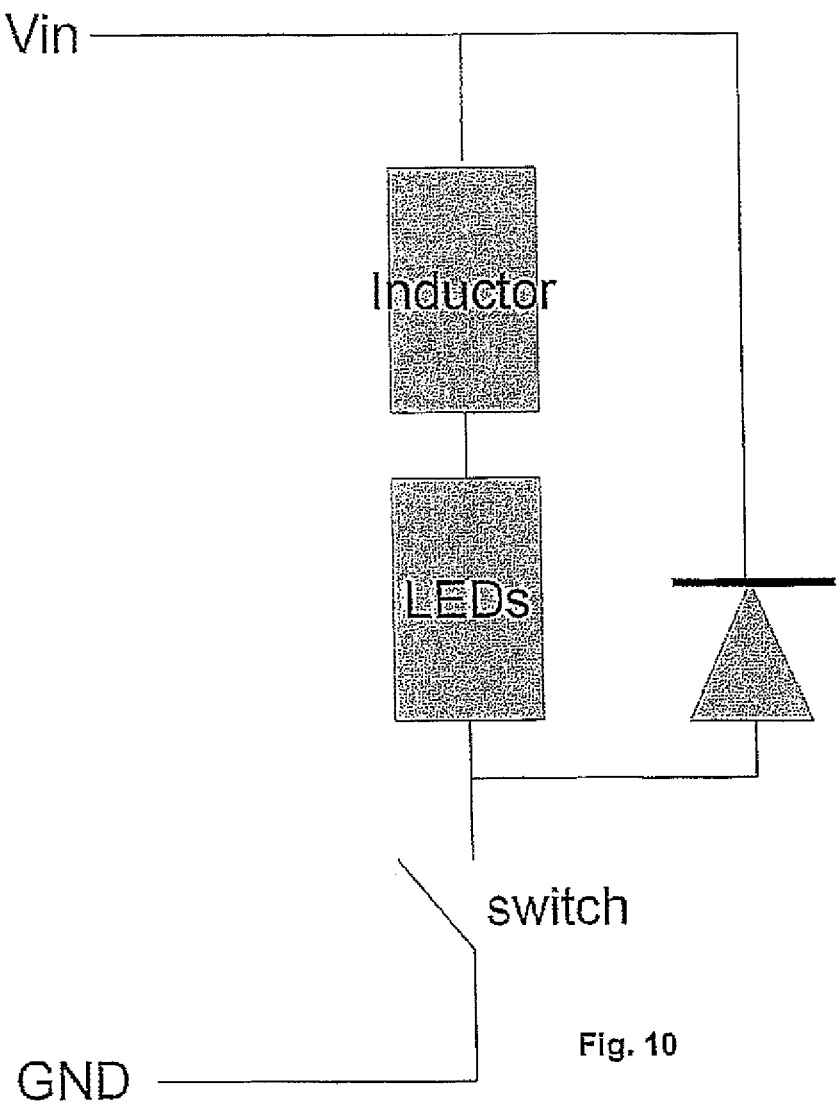
FIG. 10 illustrates a structure of hysteretic controller used for continuous operation of the circuit.

To satisfy the decoupling function, transformer 11 is an isolation transformer, and may preferably be a planar transformer. Transformer 11 is operable to work in either a continuous or discontinuous mode, although for purpose of illustration FIGS. 4, 5a, and 5b illustrates the circuitry suited for transformer 11 working in a discontinuous mode. In continuous mode certain output capacitors may be omitted as illustrated in FIG. 8 or 10. Where transformer 11 is a planer transformer based on printed circuit board technology, the printed circuit board may be FR4 PCB, Polyimide or other thick copper foil (lead frame).

Resistor $R_P$ and capacitor $C_P$ are connected in a parallel configuration with the primary end of the transformer 11. A diode $D_P$ is connected to the Resistors $R_P$, capacitor $C_P$, and the transformer 11. The conducting end of the diode $D_P$ is connected in a series configuration to the primary end of the transformer 11. The non-conducting end of the diode $D_P$ is connected in series configuration to the resistor $R_P$ and capacitor $C_P$.

A capacitor $C_S$ is connected in parallel to the secondary end of the transformer 11 for filtering the output electrical voltage. A diode $D_S$ is connected to the secondary end of the transformer 11 and the capacitor $C_S$. The conducting end of the diode $D_S$ is connected to the secondary end of the transformer 11 in a series configuration. The non-conducting end of the diode $D_S$ is connected to the positive end of capacitor $C_S$ (where applicable) in a series configuration. The LED load 100 is connected in a parallel configuration to the capacitor $C_S$. Each LED load 100 may be connected in series with the other LED load 100. The secondary side may optionally include a short circuit protection circuit 44 as will be elaborated later.

Electronic switch 14 is typically a power transistor. In this particular embodiment, electronic switch 14 is more preferably a power MOSFET. In the MOSFET configuration, the drain of the electronic switch 14 is connected to the conducting end of the diode $D_P$ and to the primary end of transformer 11. The gate of the electronic switch 14 is connected to the output pin of the IC 18, and the source of the electronic switch 14 is connected to the electrical ground.

It is to be appreciated that the electronic switch 14 may be replaced by other functionally equivalent component.

The IC controller 18 comprises an internal oscillator which is configured to turn on the gate of the electronic switch 14 with a particular turn-on time period $T_{ON}$ (switching frequency) for each clock cycle as determined by the internal oscillator. IC controller 18 is preferably an Application Specific Integrated Circuit (ASIC) programmed to sense and calculate the discharge time of the inductive elements $L_1$ and $L_2$ as a main input. ASIC 18 is programmed and configured to turn on the gate of the electronic switch 14 having a turn on period of $T_{ON}$ at each clock cycle based on the following inputs:—

(a.) A reference constant K based on the discharge time of the inductive element $L_1$ and $L_2$;
(b.) Desired output DC ripple free current for LED $I_{OUT}$;
(c.) A digitized voltage value $V_{DD}$ ($V_{in}$) tapped and digitized from potential divider 22, the potential divider 22 connected in parallel with the bridge rectifier 16;
(d.) A time value $T_{OFF}$ of the discharge of the core of transformer 11 measured through voltage potential divider 30 and compared to a reference voltage; and
(e.) The switching period T (i.e. the switching period of the electronic switch 14 as determined by the oscillator).

Using the received five inputs, the IC 18 computes an output $T_{ON}$ which is the switch on time of the electronic switch 14 mathematically expressed as equation (1).

$$T_{ON} = \frac{I_{out} * T}{K * V_{in} * T_{off}} \quad (1)$$

The reference constant K is calculated based on the inductance value of the primary and secondary windings of the transformer 11 as described in formula 2.

$$K = \frac{1}{2*\sqrt{L_1 * L_2}} \quad (2)$$

where $L_1$ is the inductance value of the primary windings of the transformer 11 and $L_2$ is the inductance value of the secondary windings of the transformer 11. The value of reference K may be stored in a memory within the IC 16. For a non-isolated direct current (DC) fly-back configuration, the reference constant K is calculated according to the following mathematical expression:—

$$K = \frac{1}{L_3} \quad (2a)$$

Where $L_3$ is the inductance value of the inductive element in the fly-back configuration.

Manipulating equation (1) and (2), $I_{OUT}$ is derived as follows:

$$I_{OUT} = \frac{V_{IN} * T_{ON} * T_{OFF}}{2 * \sqrt{L_1 * L_2} * T} \quad (3)$$

The IC controller 18 may further comprises a dimming pin coupled to a variable resistor 40 for performing dimming on the LED load 100. The dimming pin facilitates the flexibility to perform dimming via various dimming device such as potential meter, motion sensor or Infra-red sensor.

The IC controller 18 described above is typically 8-pin. To fine-tune the level of control of the IC controller 18, a higher resolution IC controller may be used. In addition to the fine-tune control of a desired ripple free current $I_{OUT}$, active power factor controller (PFC) to improve the performance of the circuit.

A higher resolution IC controller having capabilities to fine-tune the control of desired ripple-free current $I_{OUT}$ and provide active power factor control is described in another embodiment below.

Another embodiment of the invention in the form of a LED driver 500 for driving a plurality of high powered LED lamp units 100 is illustrated in FIG. 5a and FIG. 5b (with emphasis on primary side). LED driver 500 comprises a first electronic switch 513; a second electronic switch 514; a bridge rectifier circuit 516 and an integrated circuit controller 518. LED driver 500 further comprises an active power factor controller (PFC) circuitry 520. Comparing with the previous embodiment, the active power factor controller (PFC) is operable to form an additional stage of current controller to achieve an improved ripple free constant DC current. The integrated circuit controller 518 is operable to control the switching frequencies of the first electronic switch 513 and second electric switch 514 to achieve a desired power factor and output ripple free current $I_{OUT}$.

Integrated IC controller 518 is similar to the IC controller 18 comprising internal oscillators, built in Analogue to Digital convertor etc. It additionally comprises more pins for further control of the PFC controller. In this embodiment IC controller 518 comprises 14-pin. The overall resolution is higher (10 bits) thus allowing better adjustment and fine-tuning of the switching frequencies for the electronic switches 513, 514 and $I_{OUT}$.

The bridge rectifier 516 is operable to receive an AC input and produces a rectified voltage output. The rectified voltage output is passed through a capacitor $C_4$. $C_4$ is operable to function as an input voltage filter to further filter the rectified voltage from the rectifier circuit 516. Capacitor $C_4$ is connected parallel to resistors $R_8$ and $R_9$ and in series with an inductor $L_4$.

Resistors $R_8$ and $R_9$ form an input voltage divider. In operation, the voltage between $R_8$ and $R_9$ is tapped as an input voltage (denoted as $V_{inP}$) to the ASIC.

The inductor $L_4$ is connected in series with resistors $R_{10}$ and $R_{11}$. Resistors $R_{10}$ and $R_{11}$ form a PFC voltage divider, which is used to provide the PFC feedback voltage to the controller 518 via a $T_{2P}$ pin input for PFC output voltage measurement.

The first electronic switch 513 is connected in series to inductive element $L_4$ and in parallel to the PFC voltage divider. First electronic switch 513 provides the variable frequency to control the PFC output voltage. Both the first electronic switch 513 and the second electronic switch 514 may be N-channel power MOSFET. The gate of the first electronic switch 513 is activated by the ASIC (MOSOUT pin), its drain is connected in series with $L_4$ and the source is grounded.

In operation, the controller 518 drives the first electronic switch 513 to provide the necessary power factor voltage at the drain of the first electronic switch 513.

It is to be appreciated that the first electronic switch 513 may be replaced by another functionally equivalent component.

A power diode $D_3$ is connected in series with inductive element $L_4$. It allows the forward pass of the rectified PFC current; which is moderated by the first electronic switch 513.

$C_5$ is a capacitive filter for filtering the PFC output voltage.

Inductive element $L_4$ may be a standard inductor as illustrated in FIG. 5a or a transformer as illustrated in FIG. 5b. For the case where $L_4$ is a transformer, the transformer comprises $L_{4p}$ primary inductance and $L_{4s}$ secondary inductance. As illustrated in FIG. 5b, $L_{4p}$ is connected from pin 1 to pin 6; $L_{4s}$ is connected from pin 1 to pin 7 of the IC controller 518.

The following equation (4) is applicable to the transformer variant to control the output voltage of the PFC:—

$$V_{PFC,OUT} = \sqrt{\frac{L_{4p}}{L_{4s}}} \frac{V_{IN} * T_{Q2on}}{T_{Q2off}} \quad (4)$$

$V_{PFC,OUT}$ is the output voltage of the PFC, $L_{4p}$ is the PFC transformer primary inductor value, $L_{4s}$ is the PFC transformer secondary inductor value, $V_{in}$ is the input voltage, $T_{Q2on}$ is the switch on time of the first electronic switch 513, and $T_{Q2off}$ is the discharge time of the PFC transformer. $T_{Q2on}$ is controlled via the MOS OUT pin of the controller 518 and $V_{in}$ and $T_{Q2off}$ are feedback values used for ensuring and verifying that $V_{PFC,OUT}$ properly tracks a desired output voltage $V_{OUT}$.

Equation (4) is known as a voltage follower, where $V_{PFC,OUT}$ follows $V_{OUT}$; in the sense that after solving the equation, if $V_{PFC,OUT}$ is less than expected (within allowable deviation) $T_{Q2on}$ is increased, otherwise $T_{Q2on}$ is decreased.

$V_{OUT}$ is determined based on the total number of LED units and the desired current $I_{OUT}$ to be supplied to the LED units.

For the second electronic switch 514, the operation and equations for adjusting and calculation $I_{OUT}$ is identical to that described in equations (1) to (3).

As mentioned above, the secondary side of the LED driver 10, 500 may further comprise a voltage protection circuit 44. Referring to FIG. 4 for the voltage protection circuit which may be incorporated in the secondary side of the LED driver 500 although not explicitly shown in FIGS. 5a and 5b, voltage protection circuit 44 comprises a zener diode 46, a silicon controlled rectifier (SCR) 48 and a resistor 50. When a short circuit is detected, the zener diode 46 will conduct electricity thus enabling the SCR 48 and reducing the output voltage to the LEDs 100.

The LED driver 10, 500 in the context of operation of driving a string of LED light units, will be described in the following example:—

To operate the circuit, the variable resistors are adjusted to produce a voltage value of N for $V_R$ (LED driver 10), or $V_{inP}$ (for LED driver 500), where value N is an adjustment of turn on time period $T_{ON}$ of the electronic switch 14, 514 corresponding to the generation of the maximum approximately ripple-free constant current to drive a plurality of LED lamp units 100. The decrement or increment of adjustment N value will be based on the feedback and cause changes in $T_{ON}$, T directly, thus varying $I_{OUT}$ accordingly based on the variable resistor $V_R$ to dim or brighten the LED lamp units 100.

For optimization of the equations (1) to (3); the equations of the circuits may be expressed in an alternative form $$A = V_{IN} * T_{ON} * T_{OFF} \tag{5}$$

$$B = 1/K * I_{OUT} * (T_{ON} + T_{OFF} + T_{CALC}) \tag{6}$$

Wherein $T_{CALC}$ is the time after the discharge time of the inductive element to compute the formula and the switching time period of the electronic switch is the summation of $T_{ON}$, $T_{OFF}$ and $T_{CALC}$;

In each adjustment cycle of $I_{OUT}$, the values of A and B are compared.

If A is greater than B, i.e. A>B, then $T_{ON}$ is adjusted to $T_{ON}$−N for the next time period T.

If A is smaller than B, i.e. A<B, then $T_{ON}$ is adjusted to $T_{ON}$+N.

In the situation where A is equals to B, there is no updating of $T_{ON}$ and $T_{ON}$ remains unchanged.

Depending on the number of lamp units 100 and the desired current $I_{OUT}$, a user performs design optimization by changing a few critical components as follows:— inductance $L_1$ and $L_2$ of the transformer 11;
switching frequency, $V_{DS}$ Drain-Source Voltage and $I_D$ Drain current of the electronic switches 14, 514;
values of Capacitor $C_S$ and Diode $D_S$. Care must be taken to ensure that voltage across capacitor $C_S$ voltage should be higher than the voltage of the LED load 100. The diode's forward current $I_F$ and repetitive peak reverse voltage $V_{RPM}$ are parameters to consider for the choice of a suitable diode $D_S$.

Once the above components are tuned to the load specification, the IC controllers 18, 518 detects and computes the duration of the energy discharged to the load via the core of transformer 11 (or inductive element for a non-isolated flyback configuration) to the LED loads 100 to regulate the constant output current. Therefore, the controller 18, 518 can work on a wide range of load voltage and constant current for high powered LED lights 100.

The described embodiment provides for an approximately ripple free constant DC current to the plurality of high powered LED lamp units 100. The described configuration of one driver to multiple lamps is termed by the applicant as 'string configuration'.

As an optional feature, the IC controller 18, 518 may further comprise a multipoint control unit (MCU) to enable communication with intelligent control means such as power line, Digital Addressable Lighting Interface (DALI), wireless protocol for total lighting control system.

The described embodiments are based on the concept of a single LED driver 10, 500 to drive many high powered LED lamp units 100, each high powered LED lamp unit provided with a heat sink shaped and configured to dissipate heat away from the high powered LED only and the single driver configured to provide approximately ripple free constant DC current to the plurality of high powered LED lamp units has been compared with a prior art MR 16 system where one LED driver 3 is required for each LED lamp unit 4. This standard ASIC driver design solution drive in constant current and offer a wide range of flexibility to drive a series of any numbers of LEDs within the entire lighting system, the advantages of which are summarized in FIG. 6.

FIG. 7 illustrates an $I_{OUT}$ measured from a high powered LED load 100 illustrating the extent of ripple free constant DC current.

The above embodiments illustrated in FIGS. 4, 5a, and 5b have described the IC controller implementation as current controllers (i.e. manipulating $I_{OUT}$); and the transformer 11, 511 working in a discontinuous mode. Due to the flexibility of programming the ASIC based controller 18, 518, four different combination and/or modes may be achievable as follows:—

A. Voltage control instead of current control;
B. Discontinuous mode with primary inductor current feedback instead of $T_{OFF}$ based feedback (or monitoring);
C. Continuous mode with primary inductor current feedback instead of $T_{OFF}$ based feedback (or monitoring); and
D. Continuous mode for hysteretic controller.

A. Voltage Control Instead of Current Control

For using voltage control instead of current control, equation (3) may be re-written as:—

$$V_{OUT} = \frac{V_{IN} * T_{ON}}{T_{OFF}} \sqrt{\frac{L_2}{L_1}} \tag{5}$$

where $V_{OUT}$ is the output voltage. Where $L_1$ is equals to $L_2$, the equation is modified as:—

$$V_{OUT} = \frac{V_{IN} * T_{ON}}{T_{OFF}} \tag{5a}$$

B. Discontinuous Mode with Primary Inductor Current Feedback Instead of $T_{OFF}$ Based Feedback (or Monitoring)

For Discontinuous mode with primary inductor current feedback instead of $T_{OFF}$ based feedback (or monitoring), the relationship between the peak current $I_{MAX}$, input voltage $V_{IN}$, and the inductive element L is expressed mathematically as:—

$$I_{MAX} = \frac{V_{IN} * T_{ON}}{L} \tag{6}$$

Substituting equation (6) into equation (3) results in:—

$$I_{OUT} = \frac{I_{MAX} * T_{OFF}}{2T} \tag{7}$$

in the case where the inductive element L is a single inductor used in cases for example in an non-isolated configuration; and $$I_{OUT} = \frac{I_{MAX} * T_{OFF}}{2T} \sqrt{\frac{L_1}{L_2}} \quad (8)$$

in the case where the inductive element L is a transformer and $L_1$ and $L_2$ denotes the primary and secondary inductances respectively.

For application of equations (7) or (8), the circuit illustrated in FIGS. 4, 5a and 5b may be modified such that the primary current may be read by the ASIC controller through a resistor from the source of the electronic switch 14, 514 to ground or using a current transformer in series to the electronic switch 14, 514 or, in case of forward structure, the filter inductor.

C. Continuous Mode with Primary Inductor Current Feedback Instead of $T_{OFF}$ Based Feedback (or Monitoring)

For the case of continuous mode with primary inductor current feedback instead of $T_{OFF}$ based feedback (or monitoring), it is appreciated that the current flowing through the rectifier diode series to the LED is the same as the current on the LED.

Figure 9:
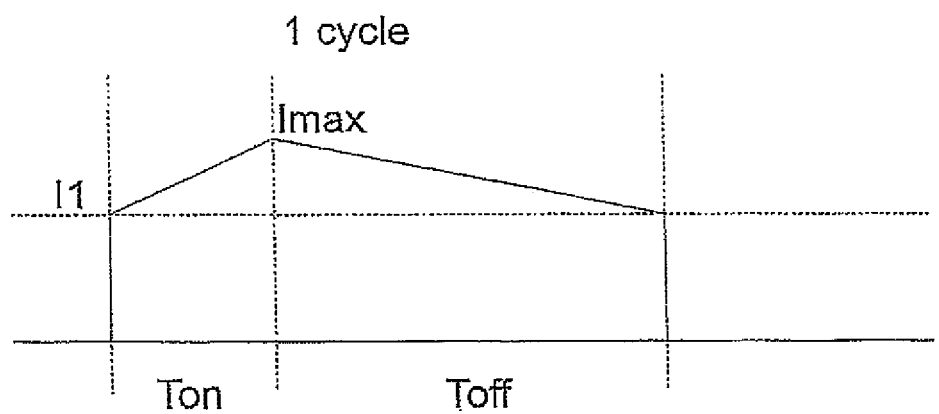
FIG. 9 illustrates electrical current flowing through rectifier circuitry in a continuous mode.

The waveform of the electrical current in continuous mode is illustrated in FIG. 9. For a given switch on timing $T_{ON}$, if the $T_{OFF}$ is fixed, the current across the diodes could be computed as:—

$$I_D = I_{OUT} = \left(T_{OFF} * I_1 + \frac{I_{MAX} * T_{OFF}}{2}\right) * \frac{1}{T} \quad (9)$$

Where $T = T_{ON} + T_{OFF} + T_{CALC}$; $T_{CALC}$ is the discharge timing of the transformer or inductor element.

All the above information may be obtained from the primary inductive element L. In particular, the circuit arrangement shown in FIG. 8 comprises:—
i. a resister in series with the electronic switch;
ii. a current transformer in series with the electronic switch; and
iii. a filter inductor.

The circuit arrangement shown in FIG. 8 comprises a first transformer 811 to isolate the load. A filter inductor 820 is used in the same way as the inductor in the hysteretic controller.

The output current $I_{OUT}$ is controlled via the feedback from the resistor 822 connected to the source of the electronic switch.

Resistor 822 is used for protection purpose not for controlling purpose. A reset circuit 812 comprising an inductor 823 and a diode 824 is used in the forward structure to completely discharge the transformer core from the residual energy. This serves to prevent the core from saturation after a certain working time.

D. Continuous Mode for Hysteretic Controller

The structure of a hysteretic controller is as shown in FIG. 10. For implementation, the value of $I_{MAX}$ and $I_1$ may be fixed according to Equation (9), and the $T_{ON}$ and $T_{OFF}$ timings determined. The current $I_{OUT}$ will however be the area under the figure.

It is to be appreciated that the continuous mode described above is particularly suited for non-isolated fly-back or feed-forward configurations only. However, it reduces the minimum number of components required and is able to provide ripple free current without the need for load capacitors. Cost savings may thus be achieved.

In the described embodiments, the dimmer 40 may be used as a means for SSL lighting dimming control for energy saving instead of conventional triac dimmer. The dimmer 40 is arranged and operable to use energy only when light is required; otherwise the light is dimmed automatically to a low intensity or completely switched off (both saving electricity as compared to full switching on of light).

As illustrated in FIGS. 4, 5a and 5b; the IC controller is connected to the dimmer 40 for better dimming performance and energy saving, such as at a low dimming level, a light output of less than 10% of total light, the power factor is maintained at more than or equals to 0.9 to meet the objective of the energy saving.

Although the dimmer 40 is illustrated in FIGS. 4, 5a and 5b, it is easily appreciated by a skilled person that the dimmer 40 may easily be incorporated in circuits as illustrated in both isolated/non-isolated configurations as well as continuous or discontinuous mode.

Figure 15:
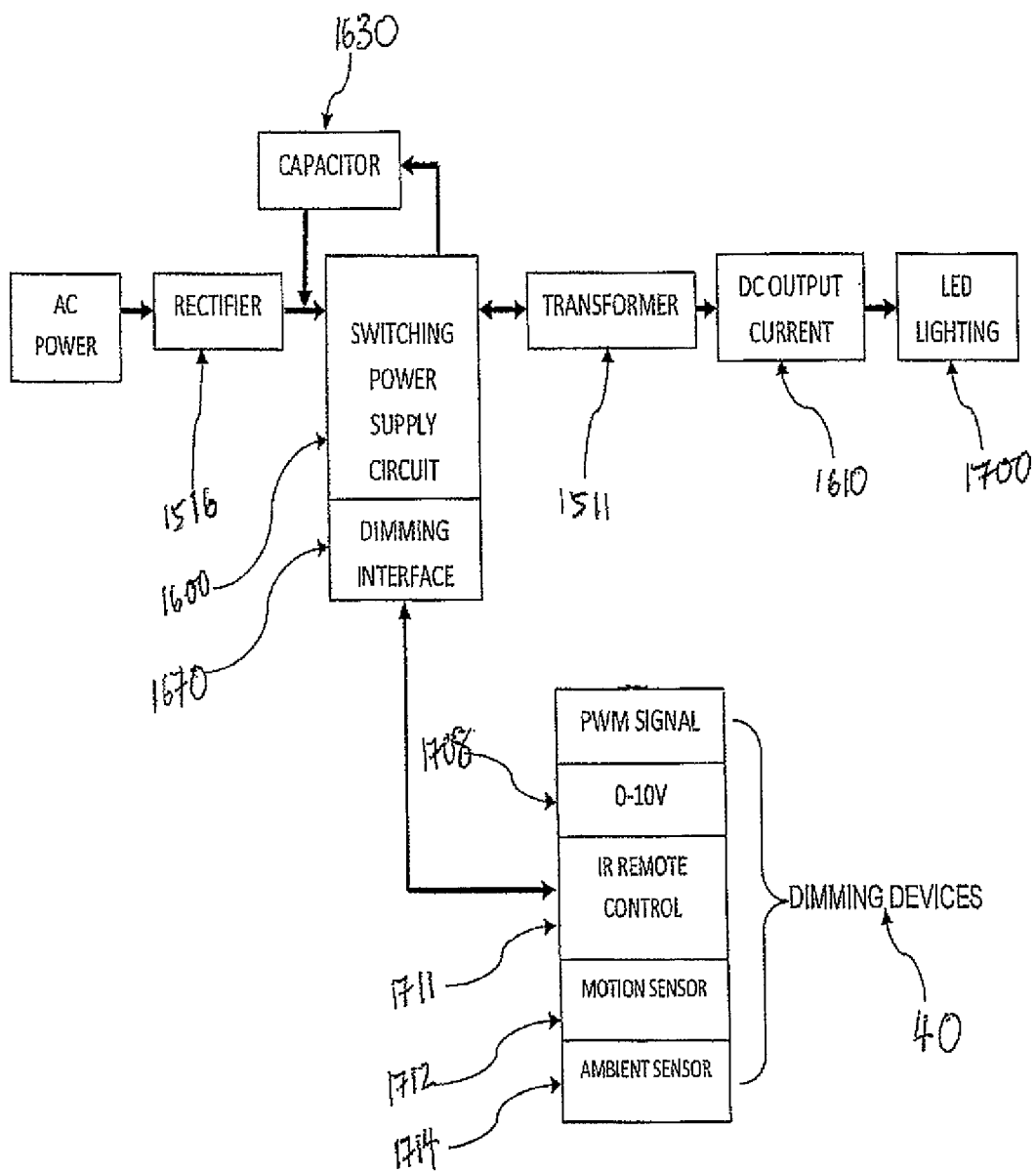
FIG. 15 shows a general block diagram on the dimmer circuitry.

Further description relating to the operation of the dimmer 40 for purpose of meeting the above objectives of energy saving and maintenance of high power factor is elaborated with reference to FIG. 15 which forms another embodiment comprising a dimmer circuitry for use with a LED driver, the dimmer circuitry comprising at least an dimming interface operable to connect to at least one dimming controller; and a capacitive element adjustable to maintain a power factor of at least 0.9 within the dimmer circuitry.

As illustrated in FIG. 15, dimmer 40 may include a variety of devices capable of interfacing with a dimming interface 1670, the interfacing including the IC controller 18, 518 pin for lighting dimming control.

When electricity supply is switched on, current flows to rectifier 1516, which then turns on the switching power supply 1600 comprising ASIC controller 18, 518. An isolated or non-isolated supply of ripple-free constant DC output current 1610 is provided. The switching power supply 1600 may be isolated or non-isolated, and depending on the configuration, inductive element 1511 may be an isolating transformer. The output of inductive element 1511 provides a isolated or non-isolated ripple free constant DC output current 1610 to the LED load 1700 to turn on the light. By default, the LED load 1700 consumes 100% energy to turning on the light, unless electrical power is switched off.

The dimmer 40 may be a 0-10V dimmer 1708. When the dimmer set to 10V, DC output current 1610 will set the light output to 100%, when dimmer set to 5V, DC output current 1610 will set the light output to 50% of total light. At 0V, no light is provided.

An infra-red (IR) remote control 1711 may also be used for remote lighting control. Such configuration requires the dimming interface to have a suitable IR receiver such that when the IR transmitter transmits the signal, the IR receiver will decode the signal and generate a PWM duty cycle accordingly from range 0-100% for dimming control. When duty cycle set to 100%, DC output current 1610 will then set the light output 100%, while IR transmitter sends 50% duty cycle, DC output current 1610 will sends 50% of total light output. If IR transmitter sends 0% duty cycle PWM signal, no light will be provided.

Another type of dimmer may be embodied as a motion sensor 1712. When there is no movement detected by motion sensor 1712, DC output current 1610 will turn the output current from 100% to 20% for dimming purpose, or even switched off the output current. This means that energy is only being used when the motion sensor 1712 detects movement.

Another option is to use an ambient sensor 1714 to detect environmental conditions, for example when dawn is approaching; DC output current 1610 will switch off the output current and turn lights 1700 off. When ambient sensor 1714 detects environment turning to dusk, DC output current 1610 will switch on the output current to 100%.

It is to be appreciated that any other devices designed with PWM output duty cycle from 0-100% may connect to the dimmer interface for LED lighting dimming control. Dimmer interface is a circuitry comprising one or more micro-controller device for detection of dimming signal from various dimmers (IR remote, motion, ambient, . . . etc), and convert input dimming signal to analog voltage to the ASIC controller for dimming control. It may also be incorporated within the ASIC controller mentioned in other embodiments. In terms of implementation, the 'Dimmer Interface' may be a small module board mounted on power supply PCB or integrate into power supply circuitry PCB.

Capacitor 1630 is a component that would affect power factor. When dimming circuit is activated, the switching power supply 1600 will automatically charge the capacitance of 1630 to maintain power factor≥0.9, such that no matter how low the dimming level goes, power factor always stay at ≥0.9.

The dimmer design from the various embodiments enable the user to dim their LED lighting unit to as low as 1~2% of the original driving current without any flickering phenomena.

Figure 11:
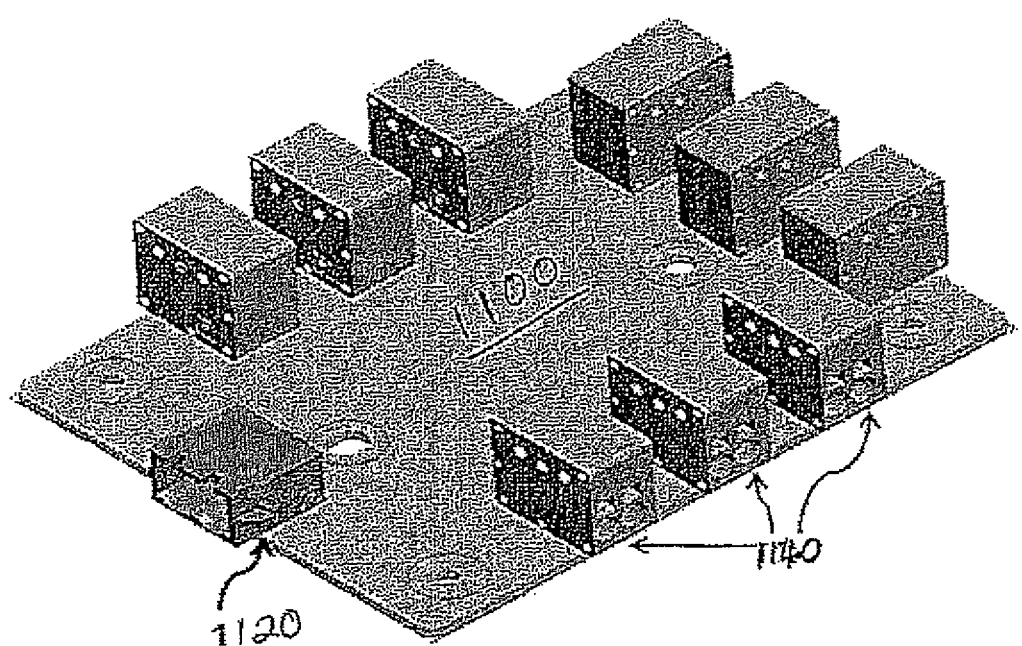
FIG. 11 is a PCB arrangement of an intermediary connector between the LED drivers and load in accordance with another embodiment of the invention.

In accordance with another embodiment of the invention there is provided a device 1100 for use with any of the LED driver 10, 500 described in the previous embodiment(s). As illustrated in FIG. 11, the device 1100 is an intermediary connector between the LED drivers 10, 500 and LED load 100. The intermediary connector is hereinafter referred to as 'junction box'.

FIG. 11 shows a PCBA design of the junction box 1100. The junction box 1100 comprises an input connector 1120 and a plurality of output connectors 1140 arranged to achieve the following:— a. Ease of installation of the high powered LED lamps load 100;

b. Advantageous for a plurality of LED lamps 100 connected in series, and alleviates the problem of a system wide open circuit in the event where a high powered LED lamp 100 breaks down;

c. Reduce or completely eliminate common errors during installation, in particular errors relating to reversal in electrical polarities.

On point (b.) above, series connection of LED lighting units 100 ensures that each lamp unit 100 would be driven with exactly the same driving current hence each LED lighting unit 100 will produce the same brightness. For lighting systems where uniform brightness is important series connection would be advantageous over parallel connection.

To achieve the above, the junction box comprises a reverse polarity protector 1160 and an open circuit protector 1180. Reverse polarity protector is preferably a rectifier 1160.

As illustrated in FIG. 11, there are nine output connectors 1140. The input connector 1120 is arranged to interface with the driver output connector; and the junction box output connector 1140 is arranged to interface with the LED load 100 which comprises the SSL driverless lighting unit strip end cable.

The input connector 1120 is typically a header type connector for coupling with LED driver 10, 500 output connector which is typically a cable entry plug-in type. The output connector 1140 is typically of a cable entry type so that the electrical connector for LED lamp 100, for example those of a strip end SSL driverless cable type can be inserted to it to produce a close electrical loop.

Figure 12:
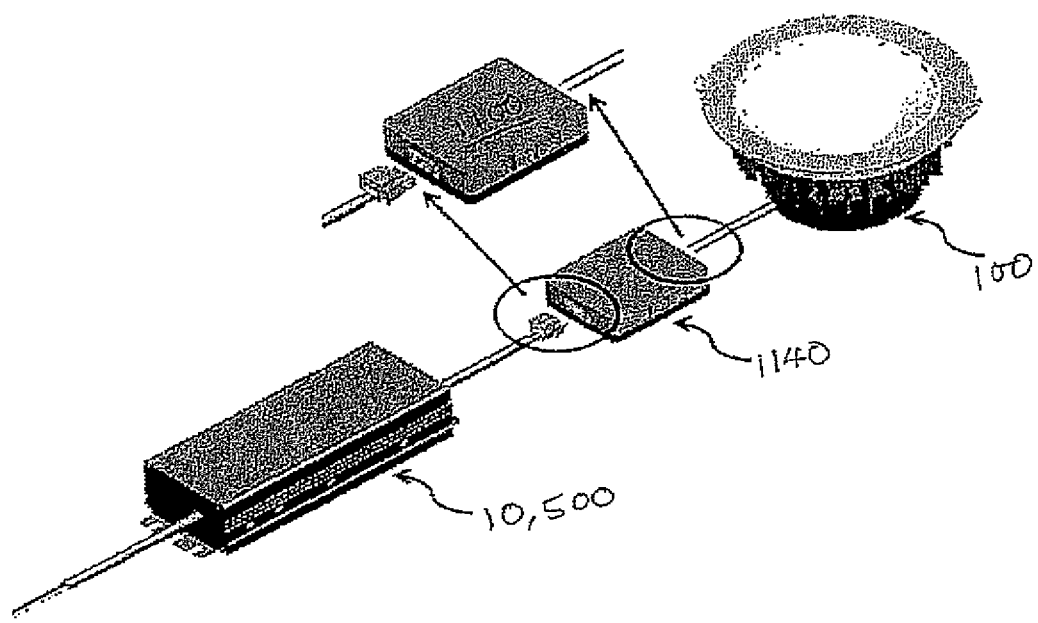
FIG. 12 is a possible arrangement of a lighting system illustrating the use of an intermediary connector between the driver and load.

FIG. 12 illustrates the lamp system comprising the single LED driver 10, 500, a single junction box 1100 and the SSL driverless light unit/load 100.

LED Driver 10, 500 with cable plug in type connector 1100 will be connected to the input connector 1120 and the SSL driverless with strip end cable will be inserted into the output connector 1140 in order to create a complete networking lighting system for lighting purposes once electrical power is switched on.

Figure 13:
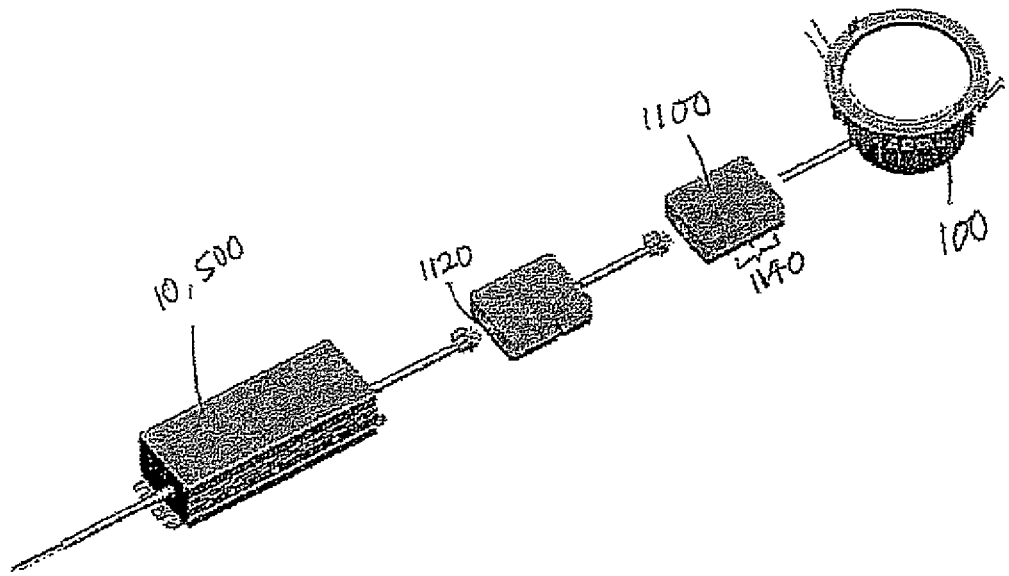
FIG. 13 is another possible arrangement of a lighting system illustrating the use of two intermediary connectors.

FIG. 13 illustrates another possible arrangement with two junction boxes 1100, wherein the entire system comprises the single string driver 10, 500, dual junction boxes 1100 and SSL driverless light unit 100.

The desired driver output voltage as predetermined by a qualified personnel will determine the total number of SSL driverless lighting units 100 or numbers of junction box 1100 that should be used for the entire lighting network in order for all the SSL driverless lighting units 100 to be driven with expected designed ripple free constant current.

As a simplified example, if the designed driver 10, 500 has a maximum output voltage rating of 170V DC and only single junction box 1100 exists in the lighting system, then each SSL driverless lighting unit forward voltage is limited to 18.8 VDC/unit (170 VDC divided by 9 units). If two junction boxes 1100 are used, then SSL driverless lighting unit forward voltage is limited to 10 VDC per unit (170 VDC divided by 17 units).

Figure 14:
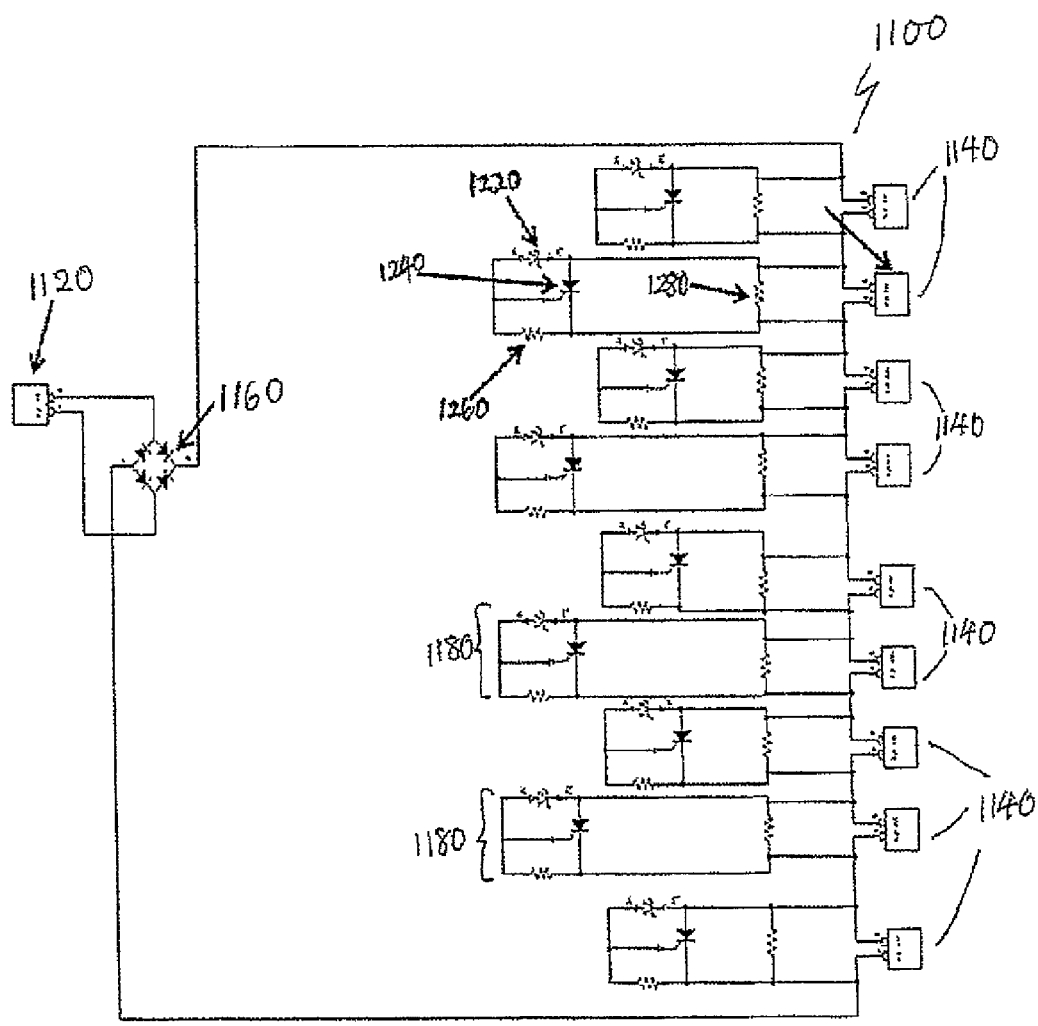
FIG. 14 shows the circuit diagram of the intermediary connector.

FIG. 14 shows the circuitry diagram between the input and output connectors and the arrangement of the rectifier 1160 and the open circuit protection circuit 1180. Bridge rectifier 1160 acts as a reverse polarity protection so that there will be no polarity concern between driver 10, 500 and junction box 1100 during installation. If an installer makes a mistake and connects a lamp unit 100 in reverse polarity, the reverse polarity protector in the form of a bridge rectifier 1160 protects the driver 10, 500 and junction box 1100 from damaging. The Open load protection circuit 1180 preferably comprises a Zener Diode 1220; Silicon Controller Rectifier (SCR) 1240 and Resistor 1260 at each output port 1140.

Additional rectifiers may also be added to the lighting units 100. This addresses the following problem:—

Although rectifiers 1160 provide reverse polarity protection between driver 10, 500 and the junction box 1100, a particular lighting load 100 must be connected in the correct polarity in order for that particular to work correctly. If lighting 100 is connected in reverse polarity the system wouldn't not work, so to overcome this the lighting units also must having a rectifier to provide reverse polarity protection.

When any open circuit occurs at any of the output connector 1140, and/or when the voltage exceed the specified reverse breakdown voltage of the Zener Diode 1220; hence causing the Zener Diode 1220 to be operated in reverse bias mode, the Silicon Controller Rectifier (SCR) 1240 will be triggered at the gate terminal to enable current to flow through the Silicon Controller Rectifier (SCR) 1240 thereby maintaining a close loop for the entire lighting system so that the other connected lighting 100 within the networking continue to operate regularly. Resistor 1260 is used a current limiter for the Zener Diode 1220 so as to prevent too large a current flowing through Zener Diode 1220. Another resistor 1280 may be connected in parallel with the open circuit protection circuit and in parallel with the output connector 1140.

As an alternative or addition to the open load protector 1180, it is appreciated that a resistor 1280 may be deployed to act as a jumper/bypass resistor for deployment to specific output connector(s) 1140 which has (have) no load 100 connected to the same so as to maintain a close loop of the entire lighting system. Where specific output connector(s) 1140 is (are) permanently not supposed to be connected any load, the open circuit protector(s) connected to these output connector(s) may be removed.

Thus, junction box 1100 has been designed and will be implemented together with string driver to overcome the above described weaknesses arising from series connection.

Examples of Operating Technical Specification

The recommended operating technical specification for the LED driver 10, 8-pin (lower resolution) configuration is listed as follows:—

Operating Voltage: 100 to 120 VAC for US; 220 to 240 VAC for EU
Operating frequency: 50/60 Hertz (Hz)
AC current: 0.2 Amperes (A) for US; 0.1 A for EU
Inrush current: maximum allowable at 4 A for US; maximum allowable at 12 A for EU
Leakage current: less than (<) 0.7 milli-A
Efficiency (full load): more than (>) 83%
Power factor (full load): more than (>) 0.98

The output specification (8-pin configuration) based on 120 VAC (US)/230 VAC (EU) input; rated load and 25 degrees Celsius ambient temperature are listed as follows:
Output channel: 1
Output voltage range: 12 to 36 VDC
Output current: 600 or 700 mA
Current tolerance: ±5%
Current adjust range: Not adjustable
Rated Power: 21.6 $W_{MAX}$ (at 600 mA) and 25.2 $W_{MAX}$ (at 700 mA)

The recommended operating input specification for the LED driver 10, 500, 14-pin configuration is listed as follows:—

Operating Voltage: 100 to 120 VAC for US; 220 to 240 VAC for EU
Operating frequency: 50/60 Hertz (Hz)
AC current: 1.3 Amperes (A) for US; 0.6 A for EU
Inrush current: maximum allowable at 7 A for US; maximum allowable at 30 A for EU
Leakage current: less than (<) 0.7 milli-A
Efficiency (full load): more than (>) 86%
Power factor (full load): more than (>) 0.96

The output specification for the LED driver 10, 500 14-pin configuration based on 120 VAC (US)/230 VAC (EU) input; rated load and 25 degrees Celsius ambient temperature having two output channels are listed as follows:
Output channel: 2
Output voltage range: 35 to 85 VDC (single channel) Total of 70 to 170 VDC
Output current: 600 or 700 mA
Current tolerance: ±5%
Current adjust range: Not adjustable
Rated Power: 102 $W_{MAX}$ (at 600 mA) and 119 $W_{MAX}$ (at 700 mA)

The LED driver 10, 500 are especially suitable for LED downlights, Troffer LED lighting and MR 16, particularly at a temperature range of 0 degree Celsius to 40 degrees Celsius.

In addition, the following advantages are also apparent:— a. Safer Methodology for LED Lighting Unit

As the LED driver 10, 500 are isolated DC configuration and only work with DC driven LED lighting Unit, there will be no safety related issue associated with AC currents for the LED lighting units 100 which are at the secondary side and isolated from the mains. As the LED driver 10, 500 will be isolated from the LED lighting unit 100 there will also be not size limitation on the design as in build in configuration so the LED driver 10, 500 can be designed in accordance to safety requirement.

b. High Electrical Efficiency

The LED Driver 10, 500; termed 'string driver' operates in thermally cooler environment because it is isolated from the LED load units 100 and not affected by the heat dissipated by the LEDs unit 100 during the continuous operation. This reduces thermal loss on the LED driver 10, 500 hence less power is consumed during operation to improve efficiency. Compared to the prior art, where each LED lamp comprises its own driver which is directly connected to the AC mains, power efficiency will be significantly improved compared to AC driver lighting unit in a complete lighting system because total power losses only apply to the particular single driver whereas AC driven lighting unit will having higher total power loss due to losses on each lighting.

c. High Efficacy (Lumens/Watt)

As an associated advantage, the string configuration offer cooler operating environment which resulted lower optical loss for the LEDs device hence higher luminous flux exhibited by the LED devices eventually improved the efficacy (lumens/watt) for the entire lighting system.

d. Longer Lifetimes

The LED driver 10, 500 using ASIC control, eliminates the use of short lifetimes components such as Aluminum Electrolytic Capacitor where this is extended the lifetimes of the LED driver 10, 500. As for the LEDs lamp units 100, the thermally cooler and operation with approximately ripple free constant current improves the performance and reliability of LED devices significantly and slow down the entire degradation progress on the LED device 100 eventually prolong the lifespan for the entire LED lighting unit.

e. Wide Range Application Options

The flexibility design for the single LED driver 10, 500 is applicable for any type of DC driven LED lighting unit and theoretically is able to drive unlimited numbers of LEDs in the entire lighting system by minor fine tuning of specific components as described earlier.

f. Cost Effective Solution

String driver configuration is a cost effective solution since single the LED Driver 10, 500 is capable to drive a series of DC driven LED lighting units whereas the prior art configuration require one driver for each LED lighting. Further, the solution also offer more competitive manufacturing cost as well as design part cost especially for heat sink.

g. Ease of Maintenance

Since the single LED Driver 10, 500 is isolated from the LED lighting unit 100, if any failure occurred within the lighting system that due to a faulty LED driver 10, 500, the user just need to replace the faulty LED driver instead of dismantling the entire LED lighting (Build-in concept). Such maintenance process is simple and may be completed within a relatively short period.

h. Miniature in Form Factor

The heat sink for the lighting luminaries will be smaller in size where the heat sink just to design to dissipate heat generated by the LED lighting unit 100 where not heat generated from the AC-DC LED driver because of isolating between them. Also the single driver can be design in such an optimized size due to less components count require for the entire system compare to integral concept and thus less material used and the introduction of planar transformer will further enhance the slim look of the driver solution instead of conventional transformer that is in bulky form factor.

It is further apparent that the LED Driver 10, 500 requires less components count and less repetition of components compared to prior art systems where each LED lamp unit requires its own AC to DC driver. The driver solution form factor is thus reduced. Besides that, manufacturing process will be simplified such that production throughput and yield rate will be improved.

It is further apparent that the heat sink form factor for each LED lighting unit 100 will be reduced in the string configuration because the each heat sink will be required to only handle the heat distributed by the LED lighting unit 100. This is because the LED driver 10, 500 is isolated from the LED lighting unit 100. This will beneficial on part cost due to less material utilization. Furthermore, the entire design cycle will be further shorten since both LED lighting unit 100 and LED driver 10, 500 design activity can be carried out simultaneously that leads to improve product time to market.

The junction box 1100 further provides additional advantages to the string driver concept as follows:— a. Error Free Installation

The Junction Box 1100 is designed with "fool proof" concept so that to provide an error free installation experience to the end user. Polarity is a concern during installation to ensure the entire lighting system work as expected. With the bridge rectifier at each junction box providing an interface with the driver 10, 500 and the SSL driverless lighting unit 100, accidental reverse polarity connection is negated during the installation. The lighting units 100 within the lighting system will operate normally as long as continuity exist between driver 10, 500 and SSL driverless lighting unit 100 regardless of polarity consideration. Further, header and plug in connector design exist on the interface between driver output and junction box input where this will totally eliminate the possibility to connect the driver output to any of the junction box output connector.

b. Ease of Installation

The junction box 1100 comprises connector design for interfacing purposes with driver 10, 500 and driverless SSL lighting units 100. A user will thus find it easy to plug in or inserting the strip end cable to the correct or dedicated connector. In addition, due to the simplification of the installation, shorter time and thus lower cost is expended for installation and system set-up.

c. Safer Installation

As only DC supply exists on the junction box 1100 a safety environment is created for installation.

d. Flexibility of Installation

Since the string driver concept do not have a wire length constraint during installation, users have the flexibility to position the SSL driverless lighting units according to their preference design and/or needs. A user may lengthen the electrical wire of the SSL driverless lighting unit 100 easily to their desire length so as to meet the application with the specific wire specification, example American wire gauge (AWG) 16~24 to have a perfect match to the junction box input/output connectors 1120, 1140. Furthermore, the junction box is also designed to support dual (or possibly larger number of junction boxes linkage) which will provide additional flexibility on the installation.

e. Ease of Maintenance

The special design feature of the junction box as described in the embodiment enables a user/installer to identify the failure unit easily and to carry out the necessary maintenance as what they experienced in conventional practice even though the string driver is running in series connection f. Reliable Connection The described input/output connectors 1120, 1140 used for the connections within the lighting system is either wire entry or latch lock type which gives a good connection compared to conventional screw tightening method widely used on the market.

It is to be understood that the above embodiments have been provided only by way of exemplification of this invention, and that further modifications and improvements thereto, as would be apparent to persons skilled in the relevant art, are deemed to fall within the broad scope and ambit of the present invention described. Furthermore although individual embodiments of the invention may have been described it is intended that the invention also covers various combinations of the embodiments discussed.

The invention claimed is:

1. A system for driving a plurality of high powered LED units, the system comprising a single driver for providing ripple free constant direct current to a plurality of high powered LED lamp units,
   the single driver further arranged to operate in an isolated alternating current fly back configuration having an inductive element as a transformer isolating the plurality of high powered LEDs at a secondary end of the transformer,
   wherein the single driver comprises a digital controller programmable to adjust the ripple free constant direct current at every predetermined time interval based on detection and computation of the duration taken for the energy to be discharged to the plurality of high powered LED lamp units.

2. A system according to claim 1, wherein the digital controller is an Application Specific Integrated Circuit (ASIC); the ASIC further operable to detect and compute the duration of the energy discharged by the core of transformer to the plurality of high powered LEDs to regulate and provide the ripple free output DC current.

3. A system according to claim 2, wherein the ASIC is programmed to receive feedback at each clock-cycle based on the duration of the energy discharged by the core of the transformer as an input to determine the amount of ripple free constant DC current at the next clock-cycle.

4. A system according to claim 3, wherein the ASIC is programmed to provide a voltage waveform to turn an electronic switch on and off at each clock-cycle.

5. A system according to claim 2, wherein the ASIC is coupled with active power factor controller.

6. A system according to claim 5, wherein the active power factor controller comprises at least one voltage follower.

7. A system according to claim 2, wherein the ASIC is of a 14-pin configuration.

8. A system according to claim 1, wherein each of the plurality of high powered LED lamp units is in series with the other high powered LED lamp units.

9. A system according to claim 8 further comprising a device having an input port and a plurality of output ports comprising:
   a reverse polarity protector arranged to be electrically connected to the input port and each of the plurality of output ports; and
   a plurality of open circuit protection circuits, each of the plurality of open circuit protector operable to connect to an output port;
   wherein the reverse polarity protector is operable to negate the polarity requirement in the event where a load is connected with a wrong polarity to any of the output port; and the open circuit protection circuit is operable to form a closed loop series connection in the event where no load is connected to an output port or when a load breaks down;
wherein the input port of the device is operable to be connected to the single driver.

10. A system according to claim 1, wherein the single driver is electrically connected to a dimmer circuitry for adjusting the brightness of the plurality of high powered LED lamp units.

11. A system according to claim 10, wherein the dimmer circuitry comprises a potential meter, infra-red interface, motion sensor or ambient sensor.

12. A system according to claim 11, wherein the potential meter is operable to work within a voltage of 0 to 10V.

13. A system according to claim 10, wherein the system comprises a capacitor operable to vary its capacitance to maintain a power factor of at least 0.9 when the dimmer is adjusted.

14. A system according to claim 1, wherein the secondary end of the transformer is electrically connected to a short circuit protection circuit.

15. A system according to claim 1, wherein each high powered LED lamp is provided with a heat sink shaped and configured to dissipate heat away from the high powered LED only.

16. A dimmer circuitry for use with the system comprising the single driver of claim 1, the dimmer circuitry comprising at least a dimming interface operable to connect to at least one dimming controller; and a capacitive element adjustable to maintain a power factor of at least 0.9 within the dimmer circuitry.

17. A system for driving a plurality of high powered LED units, the system comprising a single driver for providing ripple free constant direct current to a plurality of high powered LED lap units,
the single driver further arranged to operate in an isolated alternating current fly back configuration having an inductive element as a transformer isolating the plurality of high powered LEDs at a secondary end of the transformer,
wherein the single driver further comprises a digital controller programmable to adjust the ripple free constant direct current at every predetermined time interval based on detection and computation of the duration taken for the energy to be discharged to the plurality of high powered LED lamp units,
wherein the digital controller is an Application Specific Integrated Circuit (ASIC); and
wherein the system further comprises an electronic switch, wherein the ripple free constant DC current is achieved by means of voltage control according to the following equation:—

$$V_{OUT} = \frac{V_{IN} * T_{ON}}{T_{OFF}} \sqrt{\frac{L_2}{L_1}}$$

where $V_{OUT}$ is the voltage across the output; $V_{IN}$ is the input voltage; $T_{OFF}$ is the time of the discharge of the core of the isolating transformer; $T_{ON}$ is the switch on time of the electronic switch; $L_1$ is the inductance value of the primary windings of the transformer and $L_2$ is the inductance value of the secondary windings of the transformer.

18. A system for driving a plurality of high powered LED units, the system comprising a single driver for providing ripple free constant direct current to a plurality of high powered LED lamp units,
wherein the single driver comprises a digital controller programmable to adjust the ripple free constant direct current at every predetermined time interval based on detection and computation of the duration taken for the energy to be discharged to the plurality of high powered LED lamp units,
wherein the single driver operates in a non-isolated configuration having an inductive element operating in a continuous mode in according to the following equation:—

$$I_{OUT} = \left(T_{OFF} * I_1 + \frac{I_{MAX} * T_{OFF}}{2}\right) * \frac{1}{T}$$

where $T_{OFF}$ is fixed as a constant; $T_{ON}$ is the switch on time of the electronic switch; T is the summation of $T_{ON}$, $T_{OFF}$, and $T_{CALC}$ where $T_{CALC}$ is the time after the discharge time of the inductive element to compute the formula; $I_1$ is the desired reference current and $I_{MAX}$ is the peak current.

19. A system according to claim 18, wherein for a hysteretic controller configuration, the value of $I_{MAX}$ and $I_1$ are fixed, and the $T_{ON}$ and $T_{OFF}$ timings determined.

* * * * *